(12) United States Patent
Hartley

(10) Patent No.: US 7,065,319 B1
(45) Date of Patent: Jun. 20, 2006

(54) CHAIR MOUNTABLE EDUCATIONAL DEVICE

(76) Inventor: Shawna R. Hartley, 6800 Buena Vista Rd., Columbus, GA (US) 31907

( * ) Notice: Subject to any disclaimer, the term of this patent is extended or adjusted under 35 U.S.C. 154(b) by 765 days.

(21) Appl. No.: 10/272,813

(22) Filed: Oct. 18, 2002

(51) Int. Cl.
G09B 5/00 (2006.01)

(52) U.S. Cl. .................................. 434/307 R

(58) Field of Classification Search ............... 434/118, 434/307 R, 323; 108/1, 4, 10; 297/188.01, 297/188.05, 188.06, 188.12, 188.14, 188.18, 297/188.2; 369/635; 348/837, 838
See application file for complete search history.

(56) References Cited

U.S. PATENT DOCUMENTS

| | | | | |
|---|---|---|---|---|
| 4,968,047 A * | 11/1990 | Ferris | ..................... | 280/33.992 |
| 5,000,511 A * | 3/1991 | Shichijo et al. | ........ | 297/188.05 |
| 5,177,616 A | 1/1993 | Riday | | |
| 5,179,447 A | 1/1993 | Lain | | |
| 5,246,240 A * | 9/1993 | Romich et al. | .......... | 280/304.1 |
| 5,254,007 A | 10/1993 | Eagan | | |
| 5,292,173 A * | 3/1994 | Lambert | ..................... | 297/161 |
| 5,624,156 A | 4/1997 | Leal | | |
| 5,879,162 A | 3/1999 | Bergman | | |
| 6,045,179 A * | 4/2000 | Harrison | ................... | 297/188.2 |
| 6,206,464 B1 * | 3/2001 | Santa Rosa et al. | ........ | 297/173 |
| 6,375,259 B1 * | 4/2002 | Ma | ......................... | 297/217.3 |
| 6,425,631 B1 * | 7/2002 | Lin | ............................. | 297/173 |
| 6,554,354 B1 * | 4/2003 | Hoffman et al. | ............ | 297/145 |
| 6,702,373 B1 * | 3/2004 | Rossko | ....................... | 297/173 |
| 6,773,060 B1 * | 8/2004 | Sher et al. | ............. | 297/188.14 |
| 6,935,683 B1 * | 8/2005 | Brown | ..................... | 297/188.2 |

* cited by examiner

Primary Examiner—Kurt Fernstrom

(57) ABSTRACT

A chair mountable educational device includes a computer including a housing and a touch display mounted on the housing. The touch display comprises an input actuator. A mounting for releasably mounting the housing to a rail is attached to the housing and is positioned opposite of the touch display. The mounting comprises a first arm attached to and extending away from the housing. The first arm has a free end having a bulbous shape. A second arm has a first end and a second end. The first end comprises a saddle. The free end of the first arm is positioned in the saddle such that the first arm may be pivoted with respect to the second arm. A clamp is attached to the second end of the second arm and is adapted for selectively clamping to the rail.

6 Claims, 3 Drawing Sheets

CHAIR MOUNTABLE EDUCATIONAL DEVICE

BACKGROUND OF THE INVENTION

1. Field of the Invention

The present invention relates to educational tools and more particularly pertains to a new educational tool for providing a user with a seat-mounted, detachable educational device for a child car seat, with touch screen and voice activation.

2. Description of the Prior Art

The use of educational tools is known in the prior art. U.S. Pat. No. 5,879,162 describes an educational organizer device for students with cognitive impairment. Another type of educational tool is U.S. Pat. No. 5,624,156 describing a child safety seat with entertainment system having an audio and video device for presenting entertainment to a child. U.S. Pat. No. Des. 451,505 describes an ornamental design for a portable computer. U.S. Pat. No. 5,179,447 describes a personal video player and monitor assembly for an airline passenger seat console. U.S. Pat. No. 5,254,007 describes a baby entertainment and learning apparatus for highchairs. U.S. Pat. No. 5,177,616 describes a stowable video assembly suitable for use in an airplane seat.

While these devices fulfill their respective, particular objectives and requirements, the need remains for a device that would entertain and educate a child while the parent or caregiver is driving.

SUMMARY OF THE INVENTION

The object of the present invention is to provide a new educational tool that would provide a varied educational experience that would occupy the attention of the child, allowing the parent to concentrate on safely driving the vehicle.

Another object of the present invention is to provide a new educational tool that would be detachable so that a parent could transfer the present invention to a stroller or similar device.

To this end, the present invention generally comprises a computer including a housing and a touch display mounted on the housing. The touch display comprises an input actuator. A mounting for releasably mounting the housing to a rail is attached to the housing and is positioned opposite of the touch display. The mounting comprises a first arm attached to and extending away from the housing. The first arm has a free end having a bulbous shape. A second arm has a first end and a second end. The first end comprises a saddle. The free end of the first arm is positioned in the saddle such that the first arm may be pivoted with respect to the second arm. A clamp is attached to the second end of the second arm and is adapted for selectively clamping to the rail.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
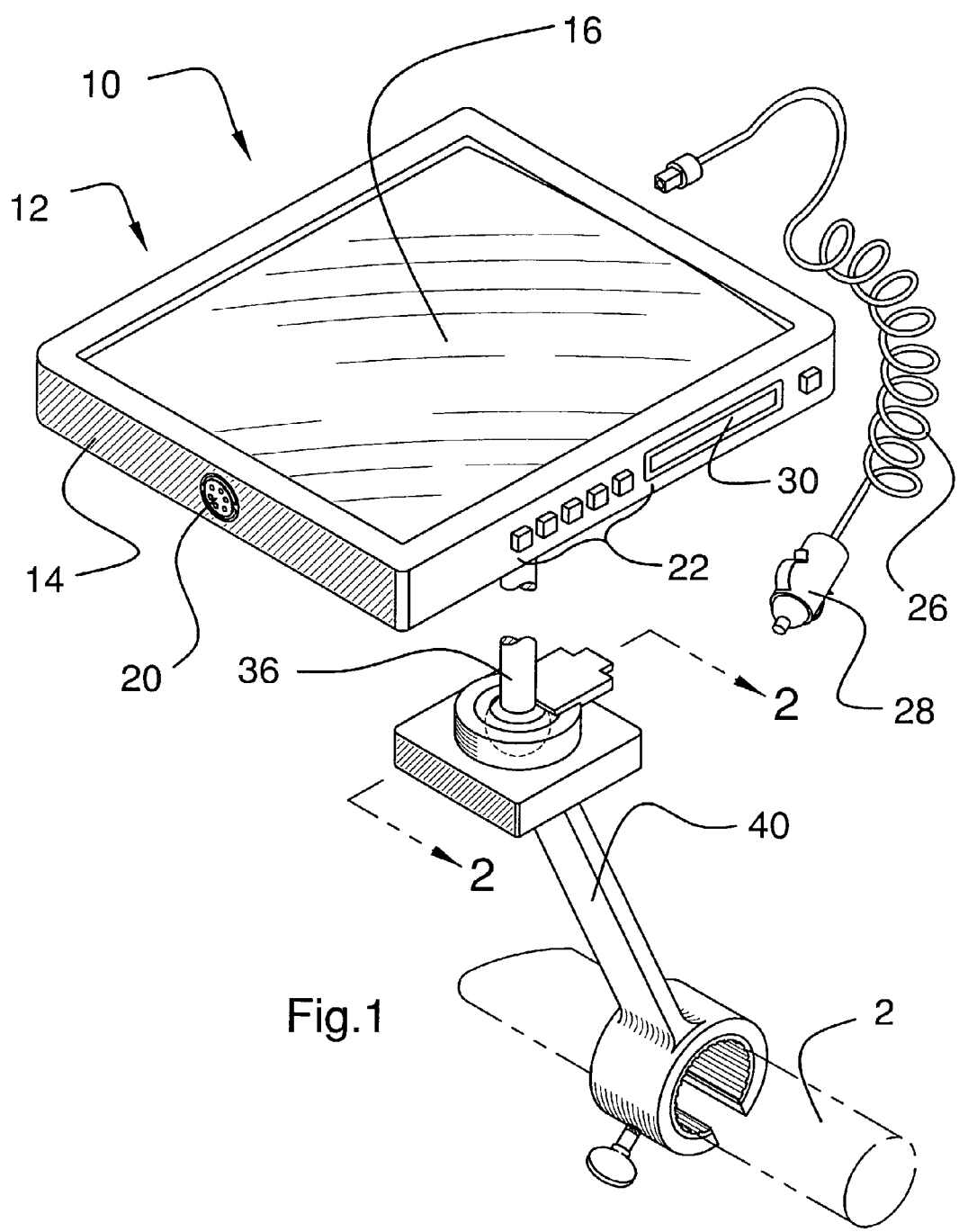
FIG. 1 is a perspective view of a chair mountable educational device according to the present invention.
Figure 2:
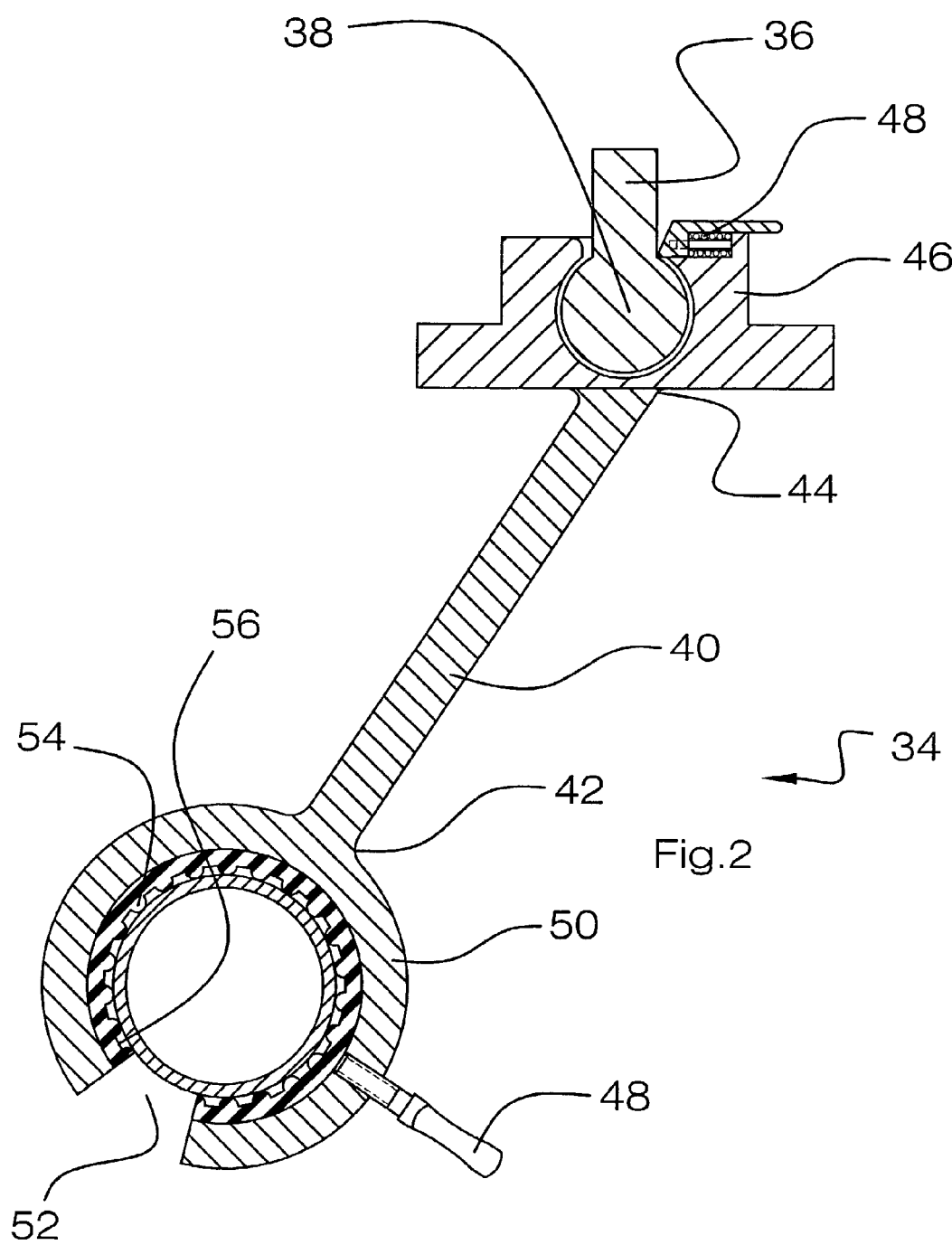
FIG. 2 is a cross-sectional view taken along the line 2—2 of FIG. 1 of the present invention.
Figure 3:
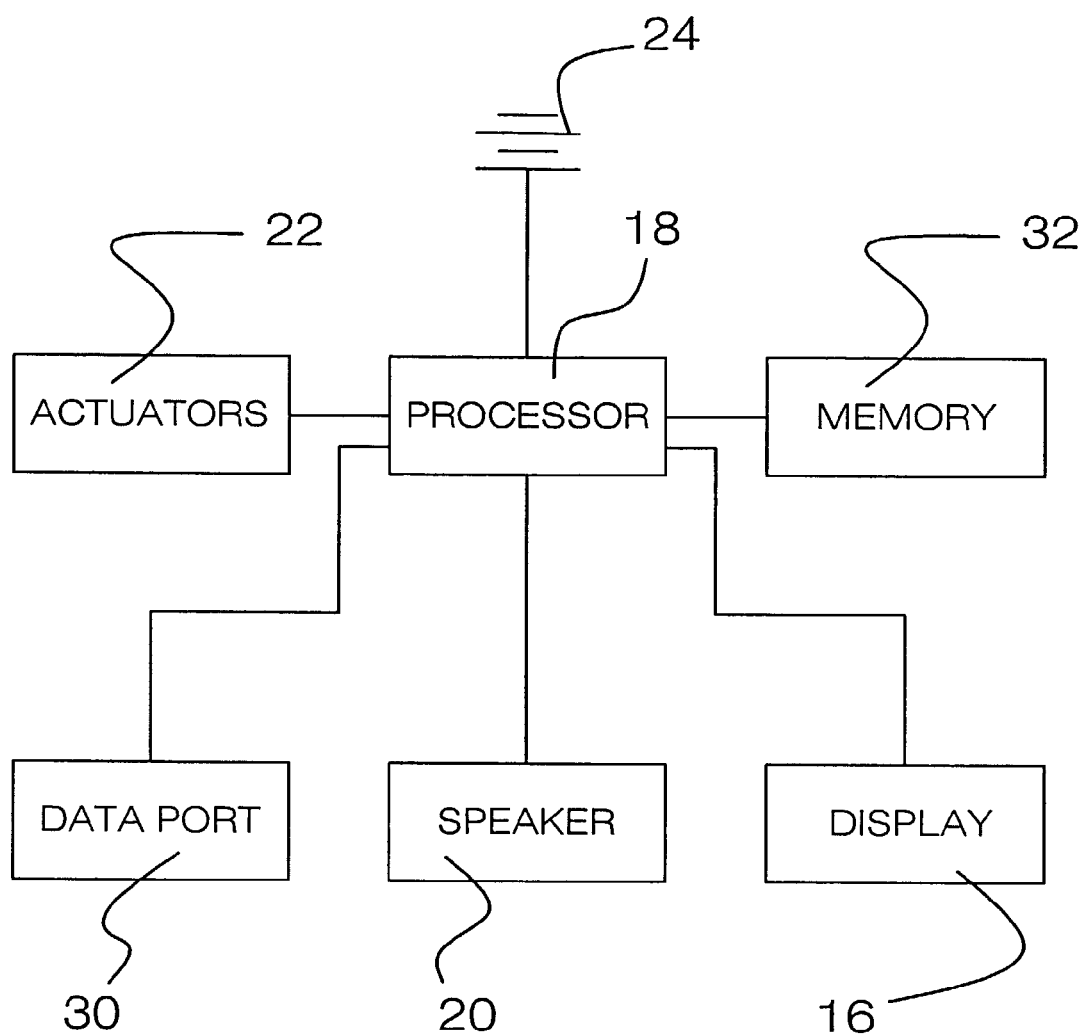
FIG. 3 is a block-diagram view of the present invention.

With reference now to the drawings, and in particular to FIGS. 1 through 3 thereof, a new educational tool embodying the principles and concepts of the present invention and generally designated by the reference numeral 10 will be described.

As best illustrated in FIGS. 1 through 3, the chair mountable educational device 10 generally comprises a computer 12 including a housing 14 and a touch display 16 that is mounted on the housing 14. The touch display 16 comprises an input actuator for inputting information into the computer 12. The computer 12 is generally a typical computer 12 and includes a processor 18 that is mounted in the housing 14 and operationally coupled to the touch display 16. At least one speaker 20 is mounted in the housing 14 and is operationally coupled to the processor 18. A plurality of actuators 22 is operationally coupled to the processor 18 and is mounted on the housing 14. The plurality of actuators 22 at least preferably includes a power button, a volume control, and cursor movement buttons. A power supply 24 is removably coupled to the processor 18. The power supply 24 includes an electrical cord 26 that is detachably connectable to the housing 14. The electrical cord 26 has an end having a male coupler 28 thereon adapted for electrically coupling to a vehicle power supply.

A data receiving port 30 is mounted in the housing 14. The data receiving port 30 can be adapted for any number of conventional data mediums including, but not limited to, compact discs, cartridges and floppy discs. Data from the data medium may be stored on memory 32 mounted in the housing 14 and operationally coupled to the processor 18.

A mounting 34 for releasably mounting the housing 14 to a rail 2 is attached to the housing 14 and positioned opposite of the touch display 16. The mounting 34 comprises a first arm 36 that is attached to and extends away from the housing 14. The first arm 36 has a free end 38 having a bulbous shape. A second arm 40 has a first end 42 and a second end 44. The first end 42 comprises a saddle 46. The free end 38 of the first arm 36 is positioned in the saddle 46 such that the first arm 36 may be pivoted with respect to the second arm 40. A securing member 48 is attached to the first end 42 of the second arm 40 and is urged in abutment against the first arm 36 for selectively locking an orientation of the first arm 36 with respect to the second arm 40.

A clamp 50 is attached to the second end 44 of the second arm 40. The clamp 50 is adapted for selectively clamping to the rail 2. The clamp 50 is preferably designed in the shape of a cylinder having an open side 52 for receiving a rail 2.

A cushioning material 54 is attached to and generally covers an inner surface 56 of the clamp 50. The cushioning material 54 enhances the gripping ability of the clamp 50 on the rail 2 and protects the rail 2 from damage. Ideally, a biasing member 58 is extended through, and threadably coupled to, the clamp 50 for biasing the cushioning material 54 against the rail 2. The biasing member 58 enhances the securing ability of the clamp to the rail 2.

In use, the device 10 is mounted on the rail 2 of a car seat, stroller or other chair in which a child is seated. The computer 12 would ideally be preprogrammed with educational software, or it could be added by the data medium. The display 16, being a touch screen, would allow a child to touch the screen for input actions instead of using a keyboard. The device 10 would educate and entertain a child while traveling or sitting. The clamp 50 is removable from the rail 2 so that the device 10 can be removed and used away from the rail 2. A cord 26 having a vehicle power supply plug 28 is used for powering the device in the vehicle. Ideally, the device 10 would also utilize disposable or rechargeable batteries for times when the cord 26 could not be used.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An educational and entertainment device for removable attachment to a support rail, said device comprising:
    a computer including a housing and a touch display being mounted on said housing, wherein said touch display comprises an input actuator;
    a mounting for releasably mounting said housing to the rail being attached to said housing and positioned opposite of said touch display, said mounting comprising;
        a first arm being attached to and extending away from said housing, said first arm having a free end having a bulbous shape;
        a second arm having a first end and a second end, said first end comprising a saddle, said free end of said first arm being positioned in said saddle such that said first arm may be pivoted with respect to said second arm; and
        a clamp being attached to said second end of said second arm, said clamp being adapted for selectively clamping to the rail.

2. The educational and entertainment device as in claim 1, further including a securing member being attached to said first end of said second arm and being urged in abutment against said first arm for selectively locking an orientation of said first arm with respect to said second arm.

3. The educational and entertainment device as in claim 1, further including a cushioning material being attached to and generally covering an inner surface of the clamp.

4. The educational and entertainment device as in claim 3, further including a biasing member extending through said clamp for biasing said cushioning material against the rail.

5. The educational and entertainment device as in claim 1, wherein said computer includes a processor being mounted in said housing and operationally coupled to said touch display, a power supply being removably coupled to said processor, said power supply including an electrical cord being detachably connectable to said housing, said electrical cord having an end having a male coupler thereon adapted for electrically coupling to a vehicle power supply.

6. An educational and entertainment device for removable attachment to a support rail, said device comprising:
    a computer including a housing and a touch display being mounted on said housing, wherein said touch display comprises an input actuator, said computer including;
        a processor being mounted in said housing and operationally coupled to said touch display;
        at least one speaker being mounted in said housing and being operationally coupled to said processor;
        a plurality of actuators being operationally coupled to said processor and being mounted on said housing, said plurality of actuators including a power button, a volume control, and cursor movement buttons;
        a power supply being removably coupled to said processor, said power supply including an electrical cord being detachably connectable to said housing, said electrical cord having an end having a male coupler thereon adapted for electrically coupling to a vehicle power supply;
        a data receiving port being mounted in said housing;
    a mounting for releasably mounting said housing to the rail being attached to said housing and positioned opposite of said touch display, said mounting comprising;
        a first arm being attached to and extending away from said housing, said first arm having a free end having a bulbous shape;
        a second arm having a first end and a second end, said first end comprising a saddle, said free end of said first arm being positioned in said saddle such that said first arm may be pivoted with respect to said second arm, a securing member being attached to said first end of said second arm and being urged in abutment against said first arm for selectively locking an orientation of said first arm with respect to said second arm;
        a clamp being attached to said second end of said second arm, said clamp being adapted for selectively clamping to the rail;
        a cushioning material being attached to and generally covering an inner surface of the clamp; and
        a biasing member extending through said clamp for biasing said cushioning material against the rail.

* * * * *